(12) United States Patent
Addleman et al.

(10) Patent No.: US 7,676,706 B2
(45) Date of Patent: *Mar. 9, 2010

(54) BASELINING BACKEND COMPONENT RESPONSE TIME TO DETERMINE APPLICATION PERFORMANCE

(75) Inventors: Mark Jacob Addleman, San Francisco, CA (US); David Isaiah Seidman, San Francisco, CA (US); John B. Bley, Durham, NC (US); Carl Seglem, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/559,750

(22) Filed: Nov. 14, 2006

(65) Prior Publication Data

US 2008/0109684 A1    May 8, 2008

Related U.S. Application Data

(60) Provisional application No. 60/864,363, filed on Nov. 3, 2006.

(51) Int. Cl.
  *G06F 11/00* (2006.01)
(52) U.S. Cl. .......................................... 714/57; 714/47
(58) Field of Classification Search ........................ None
  See application file for complete search history.

(56) References Cited

U.S. PATENT DOCUMENTS

| | | | |
|---|---|---|---|
| 5,958,009 A * | 9/1999 | Friedrich et al. ............ 709/224 |
| 6,182,022 B1 * | 1/2001 | Mayle et al. ................. 702/182 |
| 6,327,677 B1 * | 12/2001 | Garg et al. ..................... 714/37 |
| 7,050,936 B2 * | 5/2006 | Levy et al. ................... 702/181 |
| 7,076,695 B2 * | 7/2006 | McGee et al. ................. 714/47 |
| 7,197,559 B2 * | 3/2007 | Goldstein et al. ........... 709/224 |
| 7,280,988 B2 * | 10/2007 | Helsper et al. ................ 706/26 |
| 7,286,962 B2 * | 10/2007 | Di Palma et al. ............ 702/182 |
| 7,467,067 B2 * | 12/2008 | Marvasti ...................... 702/186 |
| 2002/0174421 A1 * | 11/2002 | Zhao et al. ................... 717/174 |
| 2004/0088406 A1 * | 5/2004 | Corley et al. ................ 709/224 |
| 2005/0065753 A1 * | 3/2005 | Bigus et al. ................. 702/186 |
| 2008/0306711 A1 | 12/2008 | Bansal |

OTHER PUBLICATIONS

Office Action dated May 6, 2009 in U.S. Appl. No. 11/599,755.
Response to Office Action filed Aug. 5, 2009 in U.S. Appl. No. 11/559,755.
Notice of Allowance and Fee(s) Due dated Nov. 16, 2009 in U.S. Appl. No. 11/559,755.

* cited by examiner

*Primary Examiner*—Gabriel L Chu
(74) *Attorney, Agent, or Firm*—Vierra Magen Marcus & DeNiro LLP

(57) ABSTRACT

Deviation of expected response times is used to characterize the health of one or more backend machines invoked by an application to process a request. Performance data generated in response to monitoring application execution is processed to select backend response time data. The selected data is processed to predict future values of a time series associated with backend response time. The predicted response time values are compared to actual response time values in the time series to determine a deviation from the predicted value. Deviation information for the time series data of response times is then reported to a user through an interface in a simple manner.

39 Claims, 11 Drawing Sheets

BASELINING BACKEND COMPONENT RESPONSE TIME TO DETERMINE APPLICATION PERFORMANCE

CROSS REFERENCE TO RELATED INVENTION

This application claims the benefit of U.S. Provisional Application No. 60/864,363, filed on Nov. 3, 2006, entitled "BASELINING BACKEND COMPONENT DATA TO DETERMINE APPLICATION PERFORMANCE," having inventors Mark Addleman, David Seidman, John Bley and Carl Seglem.

BACKGROUND

The growing presence of the Internet and other computer networks such as intranets and extranets has brought about the development of applications in e-commerce, education and other areas. Organizations increasingly rely on such applications to carry out their business or other objectives, and devote considerable resources to ensuring that the applications perform as expected. To this end, various application management techniques have been developed.

One approach for managing an application involves monitoring the application, generating data regarding application performance and analyzing the data to determine application health. Some system management products analyze a large number of data streams to try to determine a normal and abnormal application state. Large numbers of data streams are often analyzed because the system management products don't have a semantic understanding of the data being analyzed. Accordingly, when an unhealthy application state occurs, many data streams will have abnormal data values because the data streams are causally related to one another. Because the system management products lack a semantic understanding of the data, they cannot assist the user in determining either the ultimate source or cause of a problem. Additionally, these application management systems may not know whether a change in data indicates an application is actually unhealthy or not.

SUMMARY

The technology described herein determines the health of one or more backend machines invoked to process a request for an application. Performance data generated in response to monitoring application execution is processed to select data related to selected backend metrics. The selected data is processed to predict future values of a time series of data associated with each metric. The time series of data may relate to backend performance metrics such as backend response time or some other metric. The predicted values are compared to actual values in the time series of data to determine a deviation from the predicted value. Deviation information for the time series data of response times is then reported to a user through an interface.

In one embodiment, the deviation information may be associated with a deviation range. A number of deviation ranges can be generated based on the predicted value and the actual data point is contained in one of the ranges. The deviation information for the actual data point with respect to the predicted data point may be communicated through an interface as an indication of deviation level (e.g., low, medium, high) and updated as additional data points in the time series of data are processed.

In some embodiments, a deviation range may be selected for a data point based on two or more predicted values for the data point. When predicting values, two or more functions may be fit to past time series data values and used to predict the next data point value in the series. The predicted values and corresponding deviation range information are processed to select an overall deviation range based on factors such as highest number of occurrences, degree of deviation, and/or other factors.

The deviation information may be provided through an interface as health information for a backend. In one embodiment, the interface may provide health and/or performance information associated with a number of backends that are invoked by an application. The backend health information may be grouped by application, URL or in some other manner. In some embodiments, the backend health information may be presented as one of several levels of health by a graphical icon, such as a green icon for a normal deviation level, a yellow icon for a caution deviation level and a red icon for a warning deviation level.

A backend may be implemented as a database, another application server or other server, or some other remote machine in communication with an application on a an application server. In some embodiments, a backend may be implemented as a remote system that receives requests from an application, processes the request and provides a response. For example, the backend could be another network service.

Some embodiment may access performance data. The performance data may be generated from monitoring two or more applications, associated with one or more backends which process requests from the two or more applications, and include backend response time data for the one or more backends with respect to the two or more applications. A difference between performance data response time data points and predicted values for the response time data points may be determined. The response time data points may be associated with the response time for the one or more backends with respect to a first application of the two or more applications. Health information may then be provided for the one or more backends with respect to the first application. The health information can be derived from the difference between the response time data points and the predicted values for the response time data points.

Some embodiments may access performance data that is generated from monitoring two or more applications and associated with one or more remote systems which process requests from the two or more applications. A difference may be calculated between actual data point values of the performance data and predicted data point values for the performance data. The data points may be associated with the performance of the one or more remote systems with respect to a first application of the two or more applications. Health information can be provided for the one or more remote systems with respect to the first application. The health information can be derived from the difference between the actual data point values and the predicted data point values.

Some embodiments may determine performance by accessing performance data which is generated from monitoring two or more applications, associated with one or more external devices which process requests from the two or more applications, and includes two or more time series of data associated with response times for the one or more external devices. A value may be predicted for each data point in a first time series of data of the two or more time series of data. The first time series of data may indicate external device response time values at different times for a first external device of the one or more external devices with respect to a first application of the two or more applications. Predicted data point values for the first time series of data may then be compared to the actual data point values of the first time series of data. A deviation range may be identified from two or more deviation ranges for each difference between the predicted data point values and corresponding actual data point values for the first time series of data. A user interface may be displayed for providing external device health information for one or more external devices with respect to the first application. The external device health information may be updated based on the deviation ranges for the first external device with respect to the first application in the user interface.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
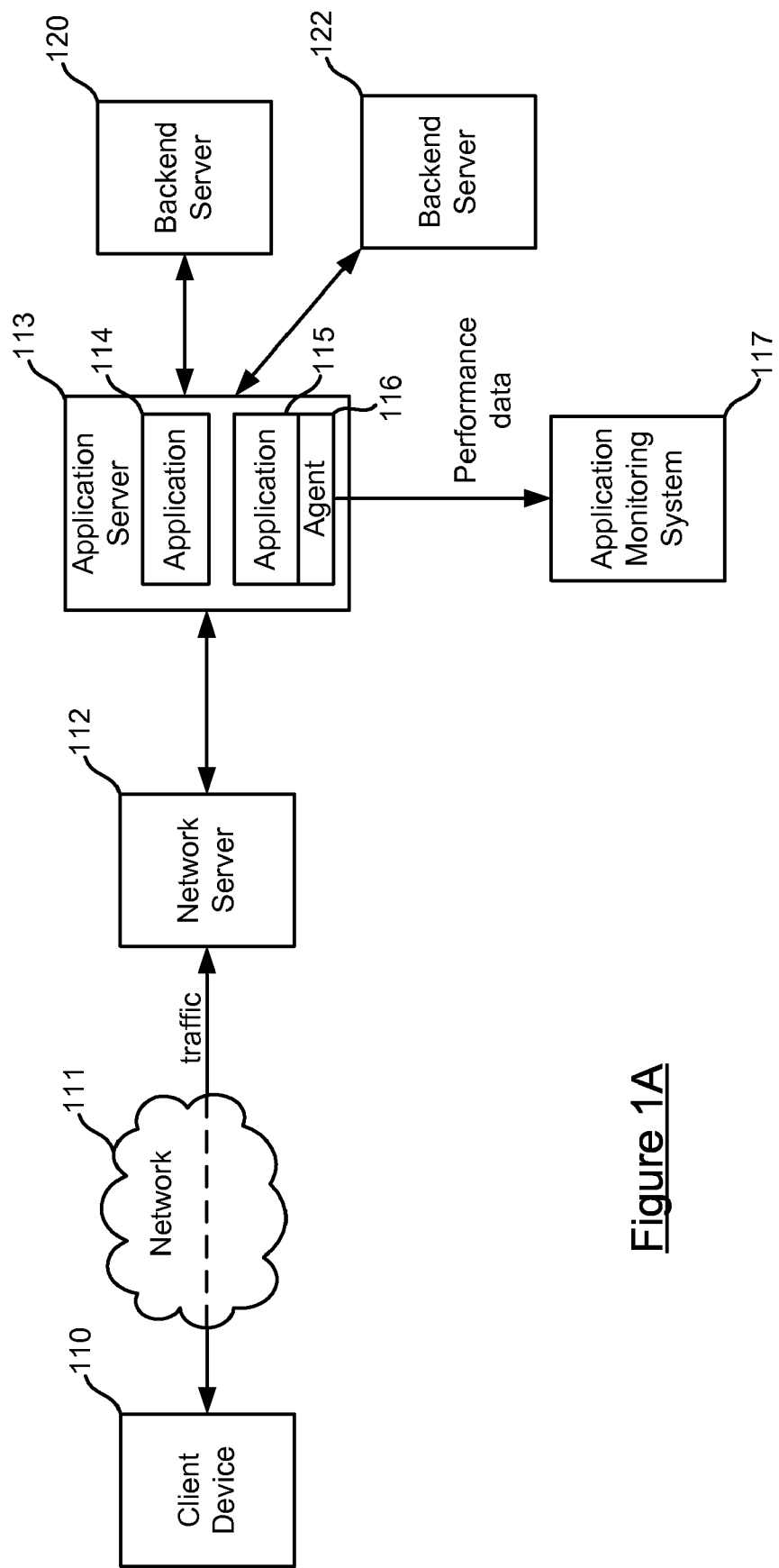
FIG. 1A is a block diagram of an embodiment of a system for determining transaction performance.

An application monitoring system determines the health of one or more backend machines invoked to process a request for an application. Performance data is generated in response to monitoring application execution. A portion of the performance data related to backends is retrieved and processed to predict data values from previous data values. In some embodiments, the backend performance data may be a time series of data. The time series of data may relate to a metric associated with the performance of the backend, such as backend response time, error rate, stall rate or some other metric. The predicted values are compared to actual values in the time series of data to determine a deviation for the actual value. Deviation information for the time series data is reported to a user through an interface. The user may then determine if a backend is unhealthy or not based on the deviation information for the backend and whether application performance is being affected by a corresponding backend.

In one embodiment, the deviation information reported to a user is based on a deviation range for the actual data point value. A number of deviation ranges can be generated based on the predicted value. The actual data point will be contained in one of the ranges, wherein the deviation associated with the range is proportional to how far the range is from the predicted value. For example, a range that contains the predicted value may be associated with a low deviation, a range adjacent to the low deviation range may have a medium deviation, and another range adjacent to the medium deviation range may have a high deviation. An indication of which range contains the actual data point value may be presented to a user through an interface and updated as different data points in the time series are processed.

In some embodiments, a deviation range may be selected for a time series data point based on two or more predicted values for the data point. When predicting values, two or more functions may be fit to past time series values and used to calculate future data point values in the series data. Deviation ranges are configured for each predicted value, and each predicted value is contained in one of its corresponding ranges. The different predicted values and corresponding deviation ranges are processed to select an overall deviation range based on highest number of occurrences, degree of deviation, and/or other factors.

The deviation information may be provided through an interface as health information for a backend. In one embodiment, the interface may provide health and/or performance information associated with a number of backends that are invoked by an application to process a request. The backend health information may be grouped by application, URL or in some other manner. In some embodiments, the backend health information may be presented as one of several levels of health. For example, graphical health icons may be used to indicate whether the backend health is at a level of low, medium or high concern. In some embodiments, a low level may be communicated as a green icon, a medium level may be indicated as a yellow icon and a high level of concern may be communicated as a red icon.

FIG. 1A is a block diagram of an embodiment of a system for determining transaction performance. The block diagram of FIG. 1A includes client device 110, network server 112, application server 113, backend servers 120 and 122 and application monitoring system 117. Client device 110 and network server 112 communicate over network 111. Network 120 may be implemented as a private or public network over which client 110 and network server 112 may communicate. In one embodiment, network 120 may be implemented as the Internet, an intranet, or some other network. In some embodiments, servers 112, 113, 120, 122, and 117 may also communicate over a network similar to network 111.

Client device 110 may be implemented as a server, computing device or some other machine that sends requests to network server 112. Network server 112 may provide a network service to client device 110 over network 111. In one embodiment, network server 112 may be implemented as a web server and implement a web service over the Internet. Network server 112 may receive a request from client device 110, process the request and send a response to client device 110. In processing requests, network server 112 may invoke an application on application server 113. The invoked application will process the request, provide a response to network server 112, and network server 112 will provide a corresponding response to client device 1110.

Application server 113 includes application 114, application 115 and agent 116. Though not illustrated in FIG. 1A, application server 113 may contain more or less than two applications and any application may be monitored by agent 116 or another agent. Applications 114-115 may process requests received from network server 112. In some embodiments, either of applications 114-115 may process a request by receiving the request, generating a response and sending the response to network server 112. In some embodiments, generating a response by an application may include sending a request to one or more of backend servers 120 or 122. The application response is then generated based on a response received from the invoked backend server.

Agent 116 generates performance data in response to monitoring execution of application 115 and provides the performance data to application monitoring system 117. Generation of performance data is discussed in more detail below. Application monitoring system 117 processes performance data reported by agent 116. In some embodiments, the processing of performance data includes providing backend health and/or performance information to a user through an interface. Application monitoring system 117 is discussed in more detail below with respect to FIG. 2B.

Backend servers 120-122 may process requests from applications 114-115 of application server 113. Each of backend servers 120-122 may be implemented as a database, another application server, or some other remote machine in communication with application server 113 that provides a service or may process requests from an application located on application server 113. In some embodiments, each of backend servers 120-122 may be implemented as a remote system that receives requests from an application, processes the request and provides a response. For example, the backend could be another network service.

Figure 1B:
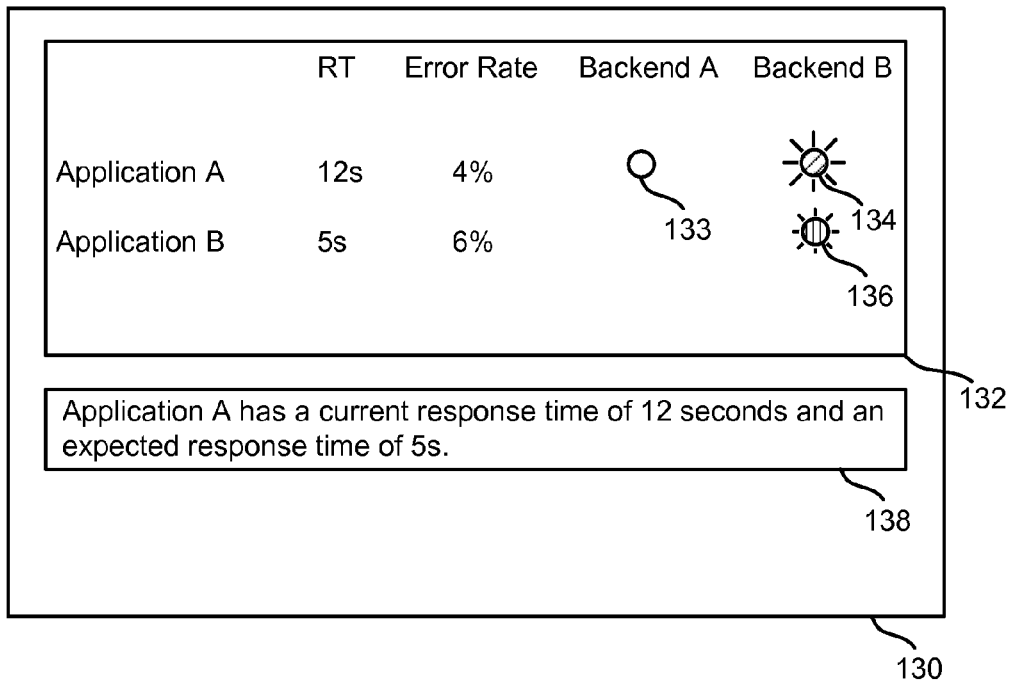
FIG. 1B is an example of an interface for providing transaction performance information.

FIG. 1B is an example of an interface for providing transaction performance information to a user for one or more applications. Interface 130 of FIG. 1B includes grid window 132 and information window 138. Grid window 132 includes rows and columns of application performance information. Each row corresponds to an example application, such as applications 114-115 of FIG. 1A. The columns provide metric information and backend health information for each application. In the embodiment illustrated, the columns include data for application response time (RT), error rate, and information health and/or performance information for example backends A and B accessed by an application. The response time column may indicate the time it takes a particular application to provide a response to network server 112 when the application is invoked. The error rate column may indicate a percentage that an application provides an error when processing a request. The columns with column headings backend A and backend B may provide health information for applications which use either backend.

The rows of grid window 132 contain information for example applications A and application B. The data in the row for application A indicates that application A has a twelve second response time, a four percent (4%) error rate, that backend A exhibits a health concern level of low when processing application A requests (indicated by the icon 133) and backend B exhibits a health concern level of high when processing application A requests (indicated by icon 134). The data in the row corresponding to application B indicates that an application B response time of five seconds, an error rate of six percent (6%), that backend A is not invoked by application B (as indicated by the absence of a health icon) and backend B exhibits a health concern level of medium when processing application B requests (indicated by icon 136). Determining backend health and a corresponding health icon to use in grid window 132 is discussed in more detail below.

Information window 138 of interface 130 provides information associated with application performance that a user may find helpful or of interest. The information provided in information window 138 may be automatically provided when a metric value is considerably different from an average metric, such as plus or minus thirty percent or more or some other value depending on the system, or the health of a backend or other system is not positive. In the example shown, information window 138 provides information that reads "application A has a current response time of 12 seconds and an average response time of 5 seconds." Window 138 may provide information to a user which may be helpful in pointing out alerts or other unhealthy elements of an application.

Figure 1C:
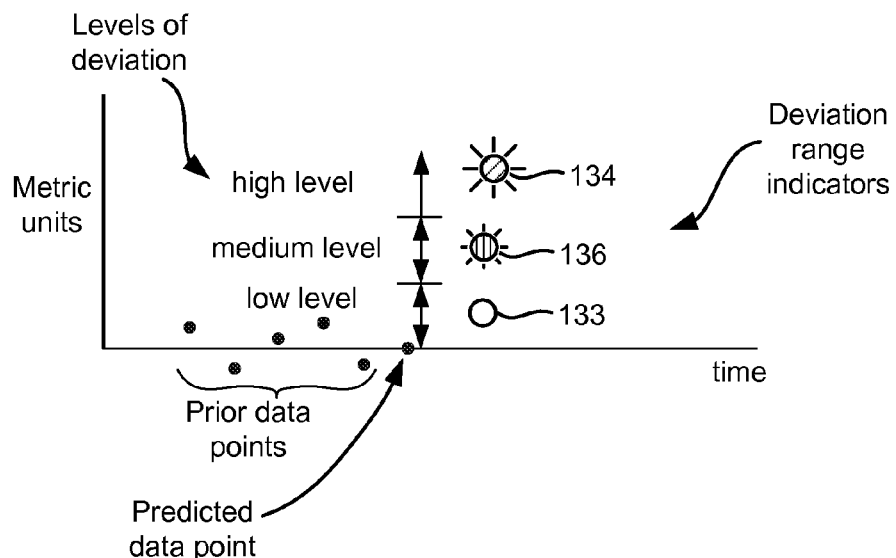
FIG. 1C is an example of a graph illustrating a metric value over time.

FIG. 1C is an example of a graph illustrating values of a metric over time for a particular application transaction. The graph of FIG. 1C has a series of prior data points plotted over time. The next data point is predicted based on the prior data points. The value of the predicted data point is used as a baseline from which one or more health levels (i.e., levels of deviation) are configured. The predicted data point may be determined from one or more functions as described in more detail below.

The graph of FIG. 1C illustrates deviation ranges associated with the predicted data point. The next data point value (i.e., the data point which follows the prior data points in FIG. 1C) will fall within one of the deviation ranges. Depending on which range the next data point value is contained in, an icon is provided in grid window 132 of interface 130. For purposes of illustration, the corresponding icons provided within grid window 132 of interface 130 are shown in the corresponding deviation range of FIG. 1C with. As shown in FIG. 1C, range deviation indicators include a normal low level icon 133, a medium level icon 136 and a high level icon 134, indicating different levels of concern that correspond to the level of deviation of the data point from the predicted data point. Determining the level of deviation for a data point is discussed in more detail below with respect to FIGS. 3-7.

In one embodiment, the technology herein can be used to monitor behavior of an application on an application server (or other server) using bytecode instrumentation. The technology herein may also be used to access information from the particular application. To monitor the application, an application management tool may instrument the application's object code (also called bytecode).

Figure 2A:
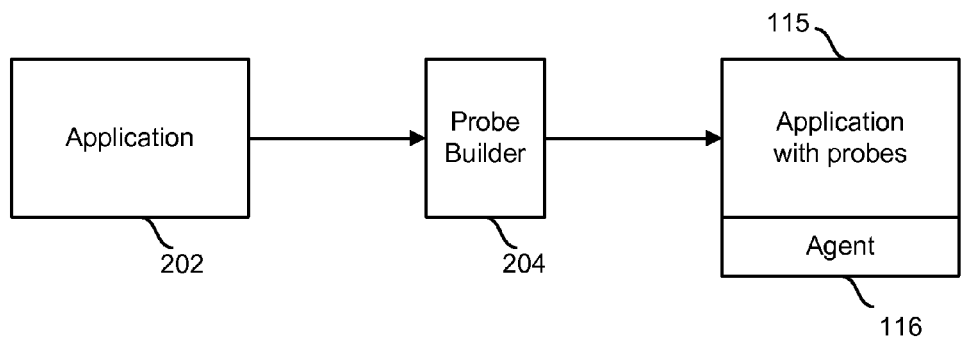
FIG. 2A depicts an exemplar process for modifying an application's bytecode.

FIG. 2A depicts an exemplar process for modifying an application's bytecode. FIG. 2A shows Application 202, Probe builder 204, Application 115 with probes and Agent 116. Application 115 includes probes used to access information from the application, and application 202 is the application before the probes are added. Application 202 can be a Java application or a different type of application.

Probe builder 204 instruments (e.g. modifies) the bytecode for Application 202 to add probes and additional code to Application 202 in order to create Application 115. The probes may measure specific pieces of information about the application without changing the application's business logic. Probe builder 204 also generates Agent 116. Agent 116 may be installed on the same machine as Application 115 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2B:
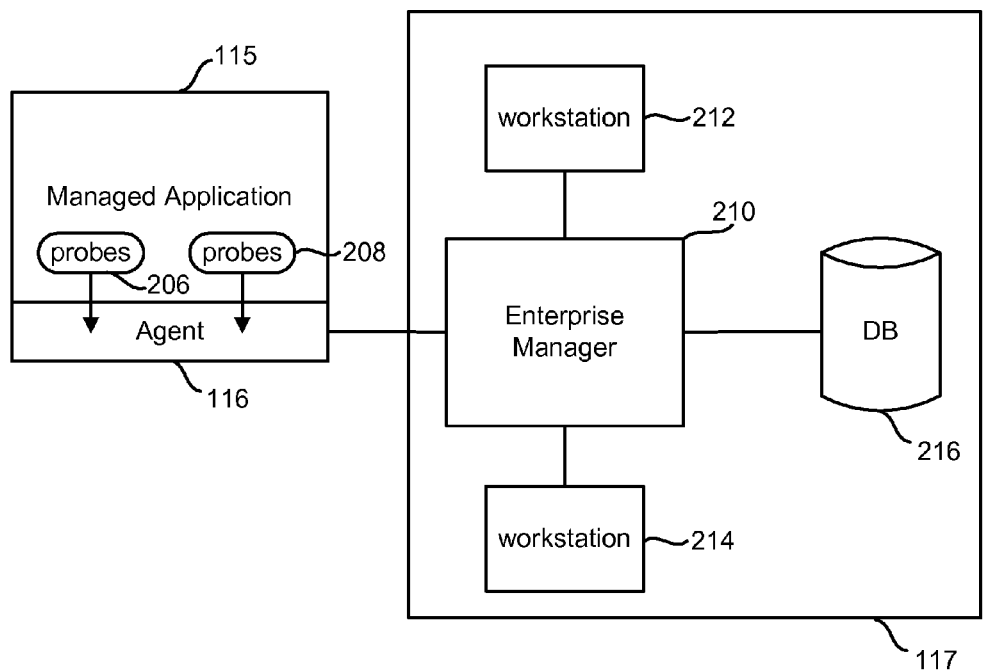
FIG. 2B is a block diagram of a system for monitoring an application.

FIG. 2B is a block diagram of a system for monitoring an application. In one embodiment, the block diagram of FIG. 2B provides more information for managed application 115 and application monitoring system 117 of FIG. 1.

FIG. 2B is a conceptual view of the components of the application performance management tool. In addition to managed application 115 with probes 206 and 208, FIG. 2B also depicts Enterprise manager 210, database 216, workstation 212 and workstation 214. As a managed application runs, probes (e.g. 206 and/or 208) relay performance data to Agent 116. In one embodiment, probes 206 and 208 may be implemented in objects and other code that write data, change data or otherwise cause the state of an application server to change. Agent 116 then collects, summarizes and sends the data to Enterprise Manager 210.

Enterprise Manager 210 receives performance data from managed applications via Agent 116, runs requested calculations, makes performance data available to workstations 212-214 and optionally sends performance data to database 216 for later analysis. The workstations (e.g. 212 and 214) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2B, each of the components is running on different machines. That is, workstation 212 is on a first computing device, workstation 214 is on a second computing device, Enterprise manager 210 is on a third computing device, and Managed Application 115 is running on a fourth computing device. In another embodiment, two or more (or all) of the components are operating on the same computing device. For example, Managed Application 115 and Agent 116 may be on a first computing device, Enterprise manager 210 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 2C:
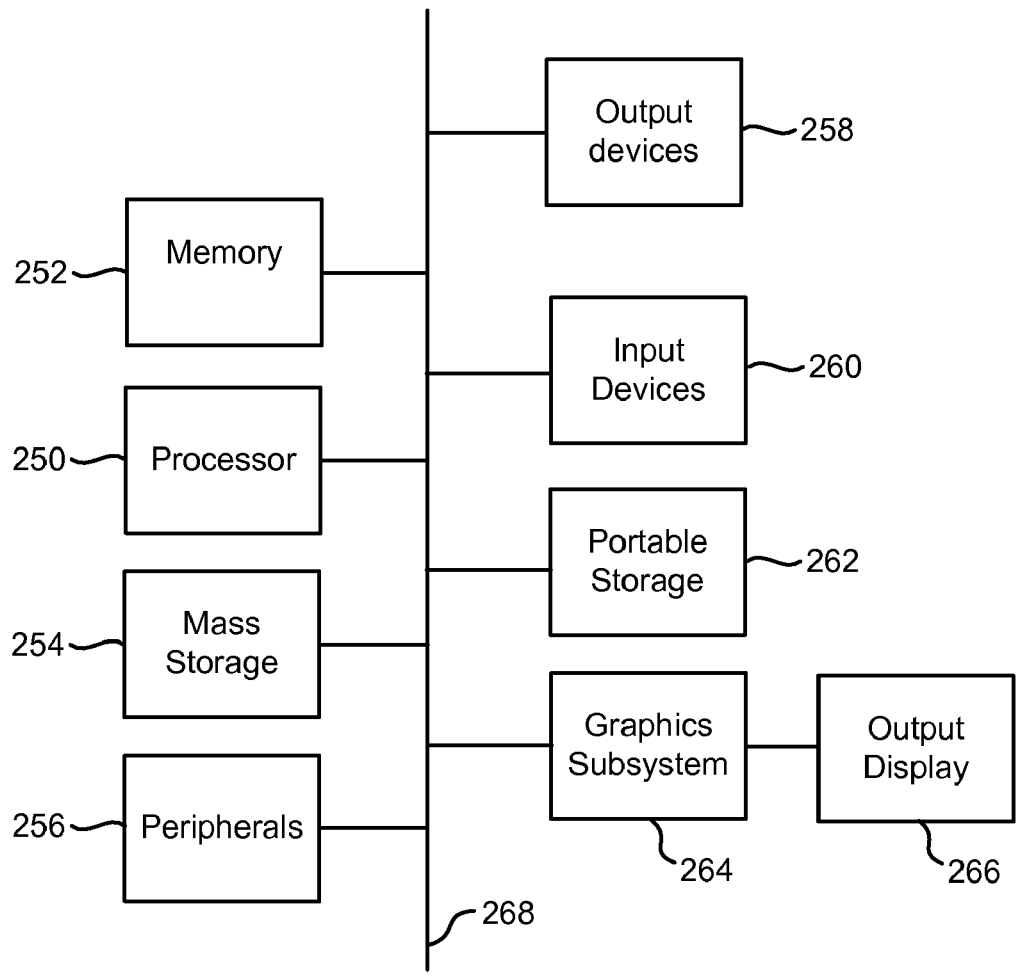
FIG. 2C illustrates an embodiment of a computing system for use with the present technology.

FIG. 2C illustrates an embodiment of a computing system for use with the present technology. In one embodiment, the system of FIG. 2C may be used to implement client device 110, network server 112, application server 113, backend servers 120-122, application monitoring system 117, enterprise manager 210, work stations 212-214, and database 216.

The computer system of FIG. 2C includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2C further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2C are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2C. In one embodiment, the system software for implementing the present invention is stored on such a portable medium, and is input to the computer system via the portable storage medium drive 262. Peripheral device (s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2C includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2C includes output devices 258. Examples of suitable output devices include speakers, printers, network interfaces, monitors, etc.

The components contained in the computer system of FIG. 2C are those typically found in computer systems suitable for use with the present invention, and are intended to represent a broad category of such computer components that are well known in the art. Thus, the computer system of FIG. 2C can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The performance data provided by Agent 116 to Enterprise Manager 210 is collected during runtime for one or more applications. The application runtime data may include metric data for one or more applications in communication with one or more backend servers 120-122 (or remote machines, devices, or systems, not illustrated). For example, the application runtime data (i.e., performance data) may include metrics of backend response time, error rate and stalls.

Response time for a backend is the time required by backend server 120 to process a request from application 115. Processing by backend server 120 may include receiving an application request, processing the request to generate a response and providing the response to application 115. In some embodiments, the backend response time is measured at the application by agent 116. For example, the response time may be determined by agent 116 to be the difference between the time a request is sent by application 115 to backend 120 and the time a corresponding response is received by application 115 from backend 120. Agent 116 may then generate backend response time data and include the data in performance data to be sent to application 115.

In some embodiments, the performance data may differentiate backend performance with respect to each of one more applications that access the backend. Thus, for two applications 114 and 115 and two backend servers 120 and 122, wherein each backend server can be accessed by each application, backend server response time data may be reported in four ways: backend response time for backend server 120 when accessed by application 114, backend response time for backend server 122 when accessed by application 114, backend response time for backend server 120 when accessed by application 115 and backend response time for backend server 122 when accessed by application 115. Thus, the performance data may "slice" or subdivide the response time data for a backend by each application that accesses the backend.

Additionally, when Agent 116 reports performance data to Enterprise Manager 210 periodically, the performance data may include several instances of response time data for each backend with respect to each application. For example, performance data may be reported by Agent 116 periodically (such as every fifteen seconds or some other time period) with each reporting including a number of response times for each backend-application combination in communication with each other. The time series of response time data may indicate each request processed by a backend for a particular application.

Error rate for a backend may be the rate at which requests sent by application 115 to backend 120 result in an error. An error may be reported to application 115 by backend server 120 and detected by agent 116. Agent 116 may then generate backend error rate data (for example, errors per 100 or 1000 requests) and include the data in performance data to be sent to application 115. Examples of errors include database is down, a requested data does not exist, a query is not formed properly, and other errors.

In some embodiments, when Agent 116 reports performance data to Enterprise Manager 210 periodically, error rate may be reported once per application-backend combination per periodic reporting. A single error rate may be reported for each backend with respect to each application in each reporting of performance data.

Stalls are conditions where a response is not provided by a backend to a requesting application within a certain period of time. Thus, if a backend does not provide a response within a threshold response time, the transaction can be considered a stall. The determination can be made by agent 116 or some other code. Agent 116 may generate backend stall data (for example, stalls per 100 or 1000 requests) and include the stall data in performance data to be sent to application 115. The reporting of stall information may be similar to that discussed above with respect to response time data. For example, stall data may be reported as a time series in each reporting of performance data for each application-backend relationship observed during the reporting period.

In some embodiments, if there are multiple data points for a given data type, the data is aggregated together. The particular aggregation function may differ according to the data type being aggregated. For example, multiple response time data points are averaged together while multiple error rate data points are summed.

Response time, error rates and stalls are examples of the many metrics that can be monitored and reported using the present technology. Other metrics and data may be monitored, processed and reported as well, including connection pools, thread pools, CPU utilization, user roundtrip response time, user visible errors, user visible stalls, and others.

Figure 3:
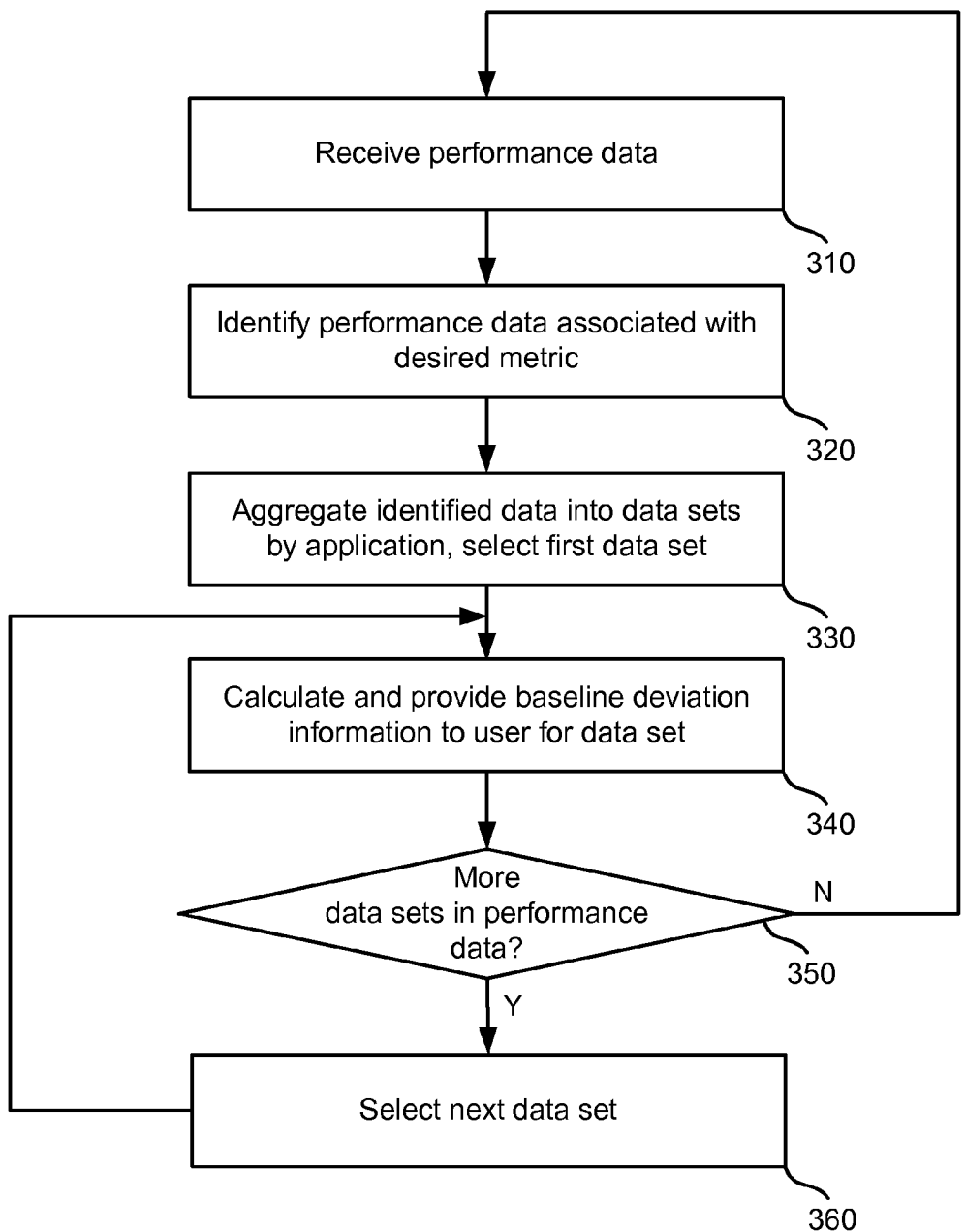
FIG. 3 is a flow chart of an embodiment of a process for providing application performance information to the user.

FIG. 3 is a flow chart of an embodiment of a process for providing transaction performance information to a user. In some embodiments, the process of FIG. 3 may be performed by application monitoring system 117. Performance data is received at step 310. The performance data may be received from agent 116 by Enterprise Manager 210 of system 117. Performance data associated with a desired metric is then identified at step 320. In one embodiment, Enterprise manager 210 parses the received performance data and identifies a portion of the performance data to be processed. The identified data to be processed may be associated with backend performance indicators, include backend response time, error rates, stalls and other backend performance data. In some embodiments, Enterprise Manager 210 may perform parsing to identify performance data that associates a URL or network server request to an application and a backend that eventually processes the URL or network server request.

In some embodiments, the data identified by Enterprise Manager 210 and associated with the desired metrics may be generated by agent 116 in response to tracing application transactions. To perform this tracing, agent 116 may leverage a Blame technology in a managed Java Application identify component interactions and component resource usage. Blame technology tracks specified components using concepts of consumers and resources. Consumers request some activity while resources perform the activity. In some cases, a component can be both a consumer and a resource, depending on the context and the operations it performs.

In one embodiment, consumers and resources are reported in a tree-like manner by agent 116 in a stack called a Blame Stack. When transactions are started, they are pushed onto the stack. When transactions are completed, they are popped off the stack. Sub-elements are Blame Stack entries for other components (e.g. methods, process, procedure, function, thread, set of instructions, etc.) that are started from within the transaction of interest.

In some embodiments, the transaction tracing and blame technology may be used to associate a URL request (or other network server request) received by an application with corresponding calls made by the application to one or more backends to process the URL request. For example, network server 112, when implemented as a web server, may receive a request for a URL that requires processing by application 115 of application server 113. Web server 112 may send a request to application 115 to process the URL request. In processing the URL request, application 115 may first process the request by a servlet (component A), which then invokes an Enterprise Java Bean (EJB) (component B), which invokes another EJB (component C), which places a call to backend 120. Thus, from the perspective of application 115, the request is processed as follows:

URL request→Component A→Component B→Component C→Backend.

Thus, a URL request is received by component A, which then invokes component B, which invokes component C which then invokes a backend server. Components A-C are contained within an application such as application 115. Using boundary blame technology to trace the transaction, the transaction processing can be represented as URL request→Application A→Backend, or even simpler as:

URL request→Backend.

Thus, the Blame technology can be implemented in agent 116 to identify what URL requests are eventually processed by a particular backend. In some embodiments, agent 116 may report data in string format such as the pseudo-data below:

Application A: URL B: called Backend C: Average Error Rate X, wherein Application A is the application that received URL request B from a network server, backend C is called by application A to process the request, and the average error rate over a period T (for example, 15 seconds) for the backend when processing application A requests is X. Other metrics such as response time, stalls, and others may be used as well. It will be understood by those in the art the performance data can have many formats, and the pseudo-data string above is only an example of one of many possible formats for reporting metrics.

While the embodiment described herein includes the use of Blame technology and a stack, other embodiments of the present invention can use different types of stack, different types of data structures, or other means for storing information about transactions. More information about blame technology and transaction tracing can be found in U.S. patent application Ser. No. 10/318,272, "Transaction Tracer," filed on Dec. 12, 2002, incorporated herein by reference in its entirety.

The identified data is aggregated into data sets by application and the first data set is selected at step 330. In some embodiments, there is one data set per application. Thus, if there is aggregated data for four different applications, there will be four data sets. The data set may comprise a time series of data, such as a series of response times that take place over time. In some embodiments, the data sets may be aggregated by URL rather than application, with one dataset per URL.

Baseline deviation information is calculated and provided to a user for a data set at step 340. In some embodiments, step 340 includes predicting a value (i.e., a baseline) for each data point in the data set, determining a deviation of the actual data point value from the predicted data point value, providing the deviation information for the data point to a user and repeating the process for the remaining data points in the data set. Providing baseline deviation information to a user for a data set is discussed in more detail below with respect to FIG. 4.

A determination is made as to whether more data sets are contained in the received performance data at step 350. As discussed above, there may be a data set for each application identified in the performance data. If more data sets exist in the performance data to be processed, the next data set is selected at step 360 and the process of FIG. 3 returns to step 340. If no further data sets exist in the performance data, the process of FIG. 3 returns to step 310 where another batch of performance data is received from agent 116 by enterprise manager 210. In some embodiments, an additional batch of performance data may be received periodically from agent 116, such as every 15 seconds.

Figure 4:
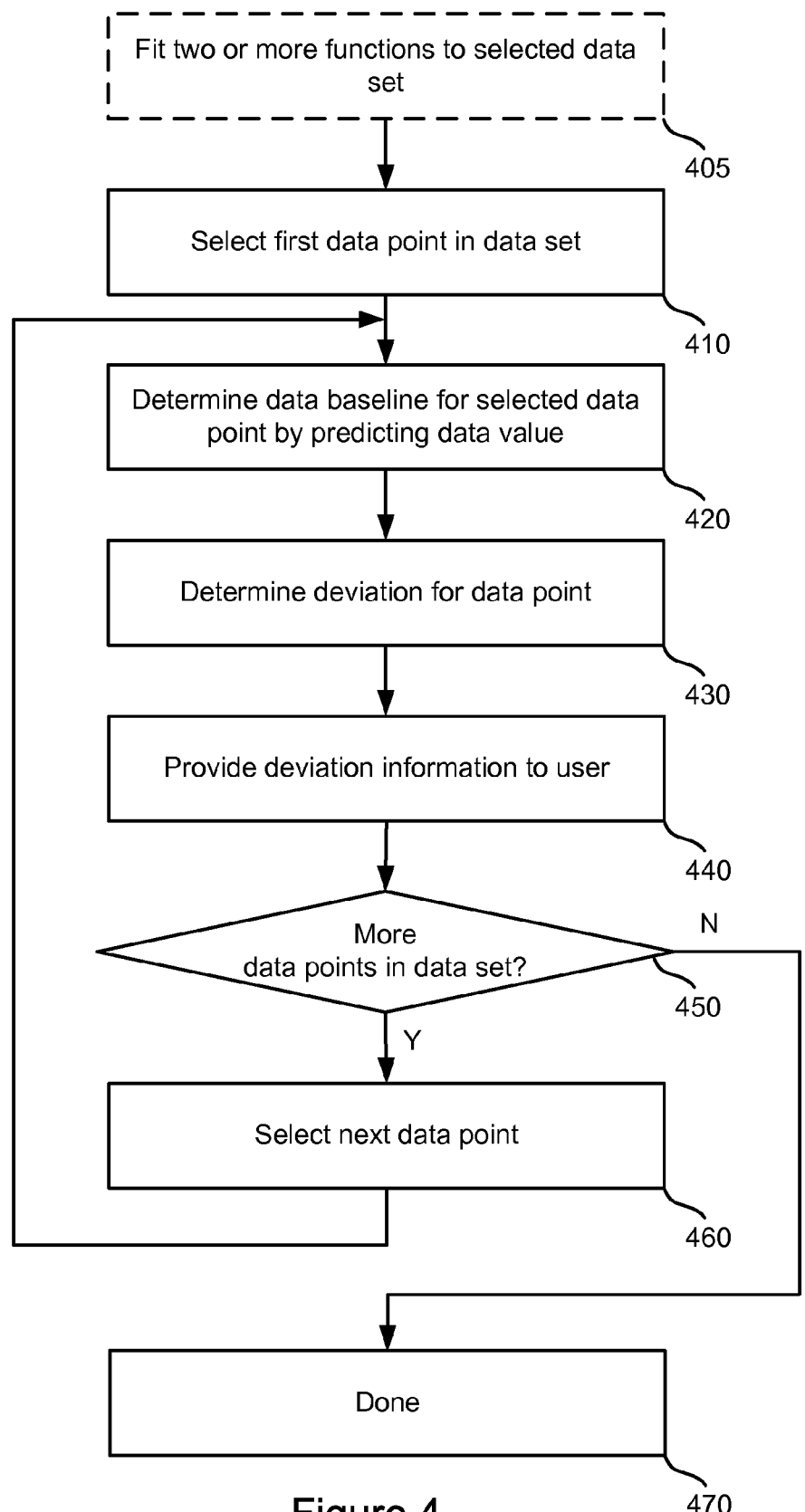
FIG. 4 is a flow chart of an embodiment of a process for providing baseline deviation information to a user.

FIG. 4 illustrates a flow chart of an embodiment of a process for calculating and providing baseline deviation information to a user. In one embodiment, the process of FIG. 4 provides more detail for step 340 of the process of FIG. 3. First, two or more functions are fit to the selected data set at step 405. In some embodiments, the first data set for a particular metric is used to fit functions to the data. Thus, the first data set may not necessarily be used to determine a baseline for data points within the data set. In some embodiments, data points in every data set may be processed using two or more functions to determine a baseline and the first data set is not used solely to fit functions to the data type. Additionally, once the functions are selected for the first data set, they may be used in subsequent data sets as well. In some embodiments, a different set of functions may be used for different data sets, such as data sets associated with a different application or a different metric. Thus, step 405 is optional as indicated by the dash lines comprising this step.

Fitting functions to a data set may include determining function constants. The constants may be determined from the first data set and enable each function to be fit to the first data set. In some embodiment, fitting two or more functions may include selecting the functions from a group of functions. For example, the five (or some other number) best fitting functions which best fit the first data set may be selected from a group of ten functions.

Several types of functions providing statistical models of an application performance data time series may be used with the present technology. Examples of statistical models suitable for use may include simple moving average, weighted moving average, single exponential smoothing, double exponential smoothing, triple exponential smoothing, exponentially weighted moving average, Holt's linear exponential smoothing, Holt-Winters forecasting technique, and others. Selecting functions, fitting functions to data, and predicting a data point using two or more functions is discussed in United States patent application Ser. No. 11/560,312, filed on Nov. 15, 2006, entitled "Time Series Anomaly Detection using Multiple Statistical Models," having inventor Jyoti Bansal, and is hereby incorporated by reference.

Next, a first data point is selected in the selected data set at step 410. A baseline for the selected data point is then determined by predicting the value of the data point at step 420. In this case, the data point value is predicted based on previous data values in the data set or a previous data set in previous performance data. Determining a baseline for a selected data point by predicting a data point value is discussed in more detail below with respect to the process of FIG. 5.

A deviation for the data point is then determined at step 430. In one embodiment, determining the deviation includes determining how far the actual data point value differs from the predicted data point value determined at step 420. The deviation may be determined as a Boolean value, a range of values, or in some other manner. Determining a deviation for a data point is discussed in more detail below with respect to FIGS. 6A-6C.

Deviation information is provided to a user at step 440. In some embodiments, the deviation information is provided to a user through an interface such as that illustrated in FIG. 1B. The deviation information may be provided in a grid, an information window, as an alert, email, page, in a file, to another application or process, or in some other manner. The deviation information may provide health information of backend systems that process application requests. Next, a determination is made as to whether more data points within the data set should be processed at step 450. If no more data points exist in the current data set being processed, the process of FIG. 4 is done at step 470. If more data points exist in the data set, the next data point is selected at step 460 and the method of FIG. 4 returns to step 420 where baseline data is determined for the currently selected data point.

Figure 5:
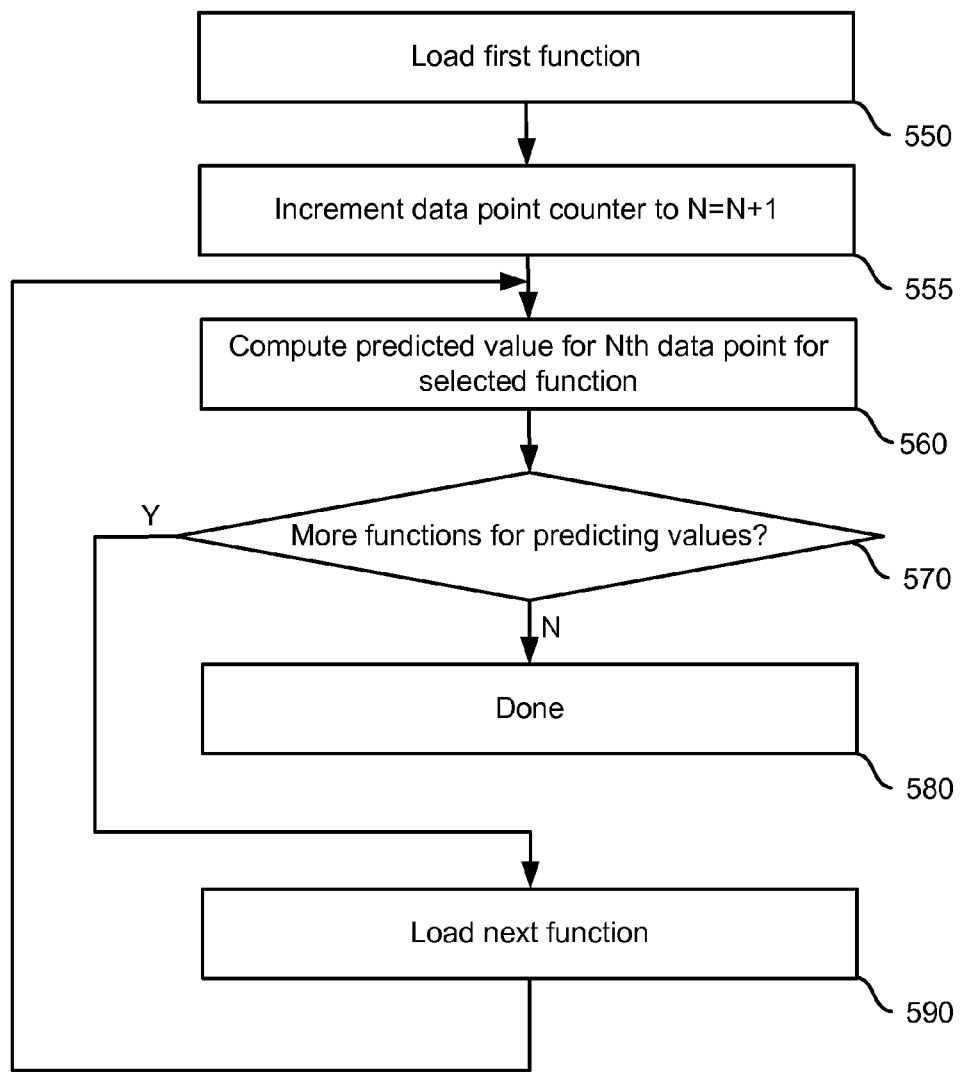
FIG. 5 is a flow chart of an embodiment of a process for predicting a data point.

FIG. 5 is a flow chart of an embodiment of a process for predicting a data point value. In some embodiments, the process of FIG. 5 provides more detail for step 420 of the process of FIG. 4. First, a first function is loaded at step 550. The function may be one of a set of several functions used to predict the data point value. The set of functions can include different types of functions, the same function type tuned with different constants, or a combination of these.

A data point counter is then incremented to N=N+1 at step 555. In this embodiment, N is the last point received and N+1 is the next data point to be processed. In one embodiment, the data point counter may be maintained by Enterprise Manager 210. A predicted value for the Nth data point (formerly the N+1 data point) is computed for the selected function at step 560. Computing the predicted value may be done using any of several functions as discussed above with respect to step 405 of the process of FIG. 4.

After computing predicted values for the Nth data point, a determination is made as to whether more functions exist for predicting values at step 570. If more functions exist for predicting the data point value, the next function is loaded at step 590 and the process of FIG. 5 returns to step 560 where the predicted value for the Nth data point is then computed using the selected function. If more functions do not exist for predicting values, the process of FIG. 5 is complete at step 580.

Figure 6A:
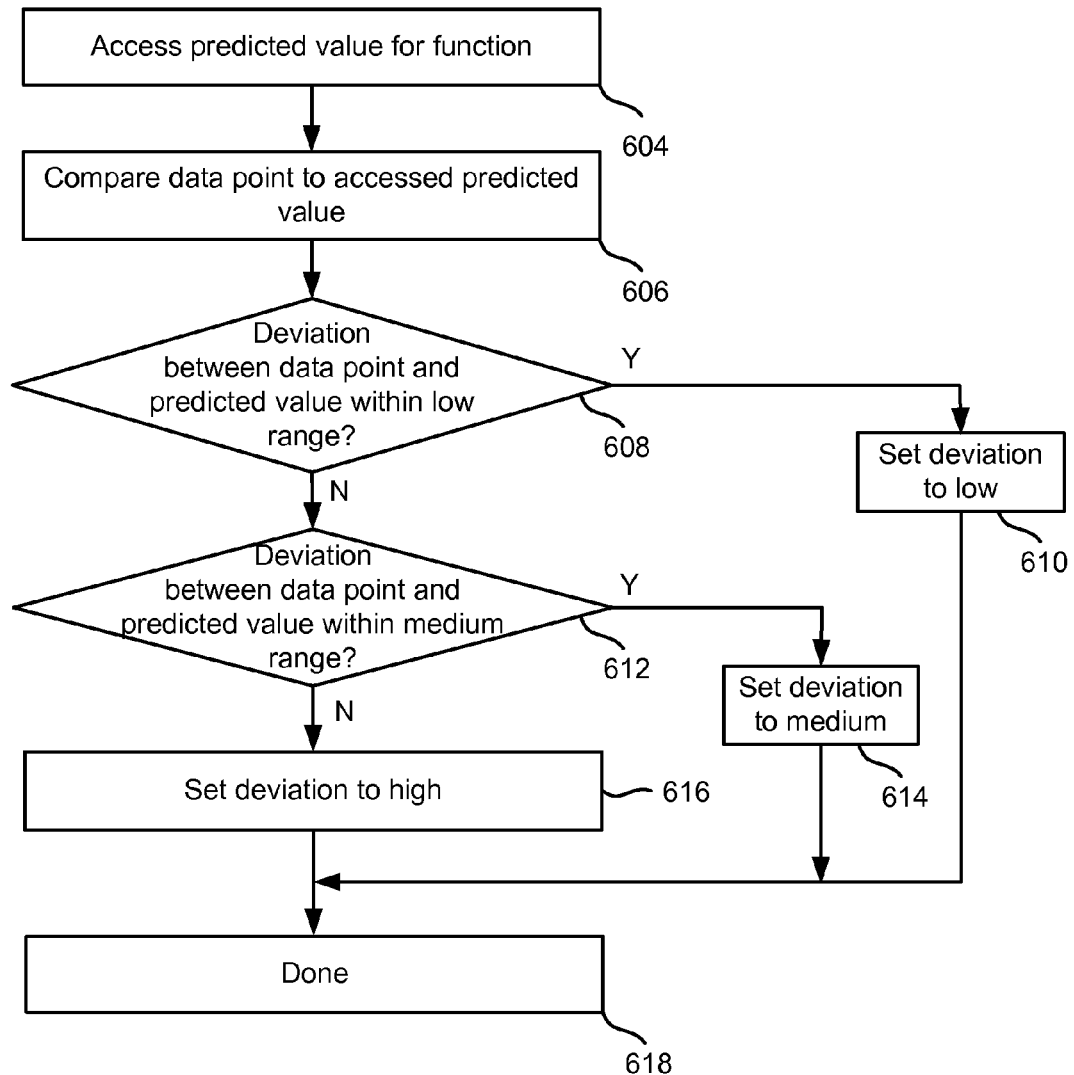
FIG. 6A is a flow chart of an embodiment of a process for determining deviation level for data point.
Figure 6B:
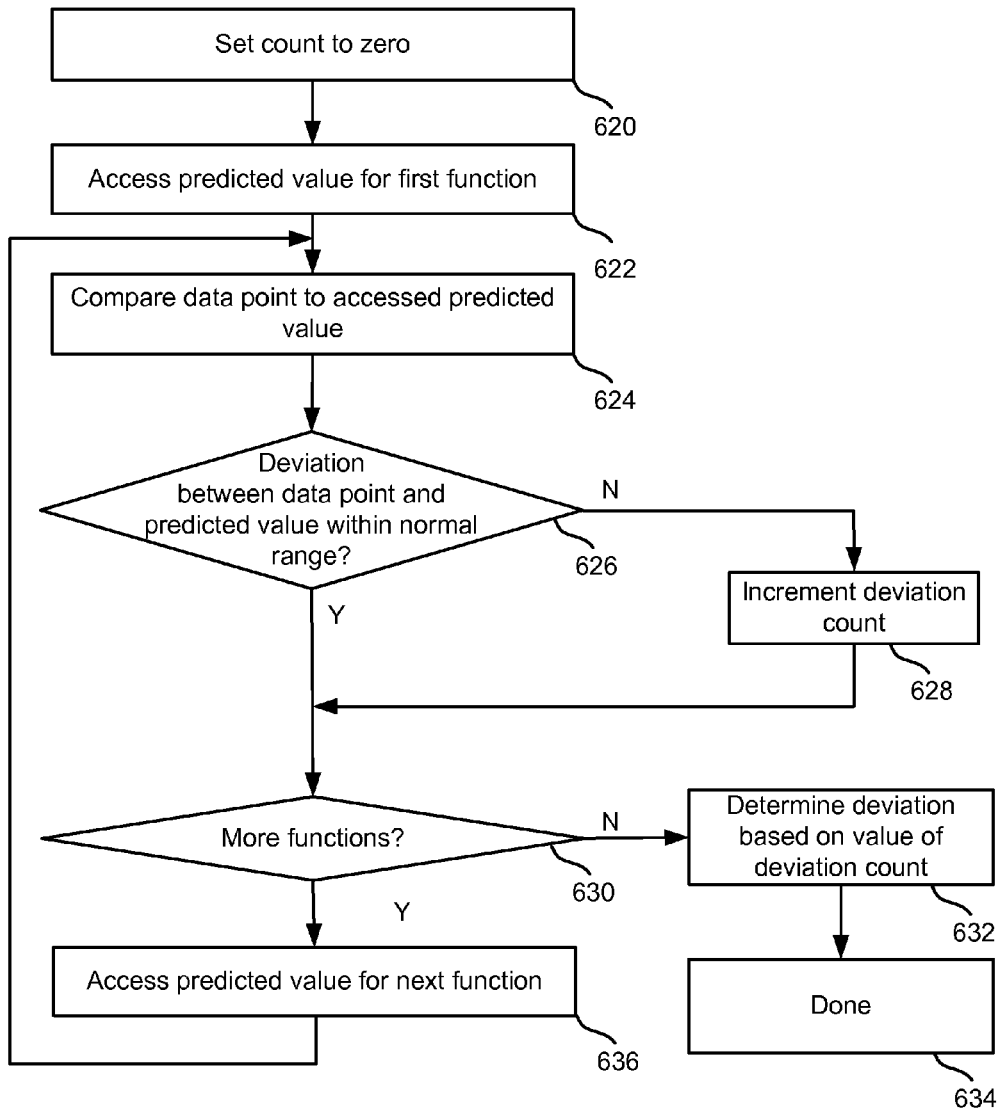
FIG. 6B is a flow chart of an embodiment of a process for determining deviation count for data point.
Figure 6C:
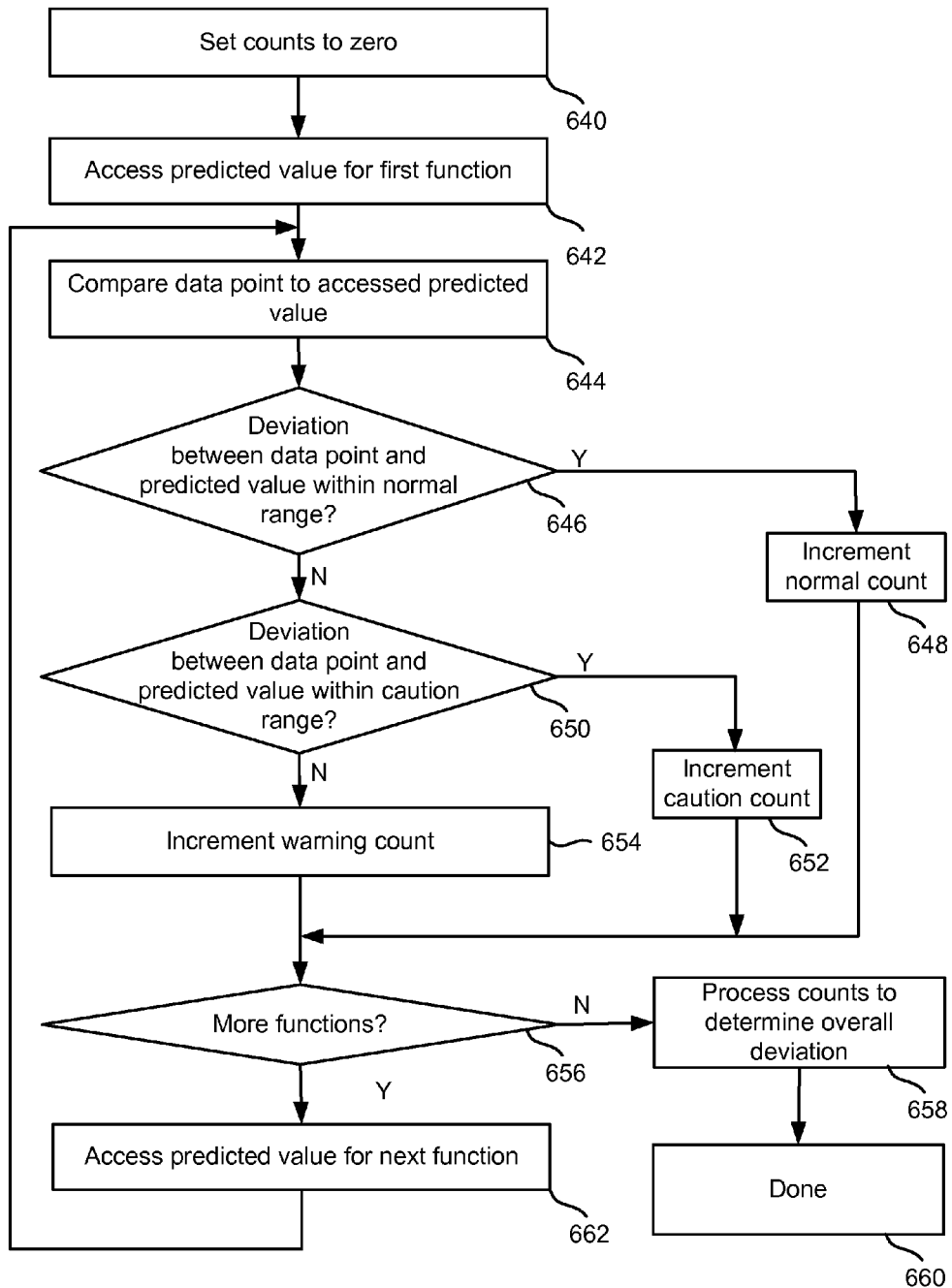
FIG. 6C is a flow chart of an embodiment of a process for determining deviation notification or data point.

FIGS. 6A-6C illustrate different embodiments for determining deviation information for a data point. In one embodiment, the processes of FIGS. 6A-6C each provide an example of more detail for step 430 of FIG. 4. The different embodiments may determine deviation information using a different number of functions, use different methods for selecting a deviation range, and differ in other ways. These illustrated embodiments are intended as examples of possible implementations and other embodiments for determining deviation information are within the scope of the present technology.

FIG. 6A is a flow chart of an embodiment of a process for determining deviation level for a data point. The embodiment described by the process of FIG. 6A uses one function to determine the deviation of an actual data point from an expected data point.

First, a predicted value for a function is accessed for the next data point at step 604. The predicted value is determined by the process described above with respect to FIG. 5. Next, the actual data point value is compared to the accessed value at step 606. A determination is then made as to whether the difference between the actual data point value and the predicted data point value is within a low deviation range at step 608. In one embodiment, a low deviation range has a small deviation, if any, and is the range associated with low level icon 133 in FIG. 1C discussed above. The low range may be configured as up to 10% deviation of the predicted value, a standard deviation from the data points in the data series, or some other range selected by a user. In some embodiments, the range may be determined automatically by the system herein. If the data point difference is within the low deviation range at step 608, the deviation is set to low at step 610 and the process of FIG. 6A ends at step 618.

If the deviation is not within the low range of deviation, a determination is made as to whether the difference between the actual data point value and the predicted data point value is within a medium range at step 612. A medium range may be configured as between 10% and 20% deviation of the predicted value, between the standard deviation and twice the standard deviation, or some other range of values. The medium range is associated with icon 136 in FIG. 1C. If the deviation is within a medium range, the deviation for the data point is set to medium at step 614 and the process of FIG. 6A ends at step 618. If the deviation is not within the medium range at step 612, the deviation is shut to a high range at step 616 the process of FIG. 6A ends at step 618. The high deviation range is associated with icon 134 in FIG. 1C.

FIG. 6B illustrates a flow chart of an embodiment of a process for determining deviation count for data point. In one embodiment, the process of FIG. 6B provides more detail for step 430 of the process of FIG. 4. First, a count is set to zero at step 620. In some embodiments, the count represents a number of times that a data point value falls outside the low deviation threshold associated with each predicted data point value. A predicted value of a data point associated with a first function is accessed at step 622. Next, the actual data point value is compared to the accessed data point value at step 624. The accessed data point value is the value predicted in the process of FIG. 5.

A determination is made as to whether the deviation between the actual data point value and the predicted data point value is within a threshold at step 626. In one embodiment, the threshold may be the limit of a low deviation range, such as 10% of the predicted value, a standard deviation, or some other value. If the deviation is not within the threshold, the count is incremented at step 628. After incrementing the count, the process continues to step 630. If the deviation is within the threshold, the process of FIG. 6B continues to step 630.

A determination is made as to whether more functions are used to predict the current data point at step 630. If more functions exist, a data point value predicted by the next function is accessed at step 636. The process of FIG. 6B then returns to step 624 where the actual data point value is compared to the predicted data point value for the next function. If no more functions exist which were used to predict a data point value for the current data point, the deviation is determined based on the value of the deviation count at step 632. In some embodiments, a count of 20-50% of the number of functions used to predict the data point may indicate a medium range of deviation. A count having a value of 50% or more of the number of functions used to predict the data point may indicate that the deviation is within a high deviation range. For example, if six functions were used to predict a data point value and the actual data point value is outside the threshold for two of the six predicted values, this corresponds to 30% and a medium deviation range. If the actual data value is outside the threshold for four of the six predicted data values, the deviation range associated with the actual data point would be a high deviation range. The process of FIG. 6B is then complete at step 634.

FIG. 6C illustrates a flow chart of an embodiment of a process for determining deviation notification for a data point. In one embodiment, the process of FIG. 6C provides more detail for step 430 for the process of FIG. 4. First, two or more counts are set to zero at step 640. In the embodiment of FIG. 6C, a count is used for each of a low deviation range, medium deviation range and high deviation range. The counts are used to keep track of the number of actual data point values that differ by the corresponding deviation (low, medium, high) from their predicted data point value. A predicted value for a first function is accessed at step 642. The predicted data point value is the value predicted by the process of FIG. 5. Next, the actual data point value is compared to the accessed value associated at step 644.

A determination is made as to whether the difference between the actual data point value and the predicted data point value are within a low deviation range at step 646. The low deviation range may be configured as ten percent of the predicted value, a standard deviation from the predicted value, or in some other manner. If the deviation is within a low deviation range at step 646, a low count is incremented at step 648 and the process of FIG. 6C continues to step 656. If the deviation is not within the low range, a determination is made as to whether the deviation between the actual data point value and predicted data point value is within a medium deviation range at step 650. If the deviation is within the medium range, a medium count is incremented at step 652 and the process of FIG. 6C continues to step 656. If the deviation is not within the medium range at step 650, the data point value is in a high deviation range, a high count is incremented at step 654 and the process of FIG. 6B continues to step 656.

A determination is then made as to whether more functions were used to predict data points for the actual data point at step 656. If more functions were used, a predicted value generated by the next function is accessed at step 662. The process of FIG. 6A then returns to step 644 where the accessed predicted data point value is compared to the actual data point value.

If no more functions were used to predict values for the current data point, the counts are processed to determine the overall deviation at step 658. In some embodiments, the count (of the low, medium and high count) which has the largest value is selected as the corresponding range associated with the data point. Thus, if the low count has a value of one, the medium count has a value of three, and the high count has a value of one, the current data point will be associated with a medium deviation range. The process of FIG. 6C is then complete at step 660.

In some embodiments, a count may be incremented by a value greater than one in the embodiments of FIGS. 6B-6C or other embodiments that use counts. A process may be used to weight the increment value when a particular function is trusted or more closely resembles a time series than other functions used to predict values of the time series. For example, if a function appears to represent a time series with a low deviation for a certain period of time, the increment value for the function may be weighted to increment a counter more than normal if the actual data point value differs from the predicted data point value. In some embodiments, the increment associated with a function may be weighted if the difference calculated between the last hundred (or some other number) actual data points and the data points predicted by a function has been less than a threshold value. Thus, a determination may identify whether the function has a history of accurately predicting values for the times series.

A time series may experience an increase or decrease in values over time that may not be due to application or backend health. For example, in some embodiments, different functions can be used to analyze a time series for different periods of time. For example, an application which generates a time series may experience more activity (for example, receive more traffic) during business hours, or more activity on weekdays then weekends. The change from a recognized busy period to a less busy period (e.g., Friday to Saturday, or 5 p.m. to 6 p.m.) may cause a change in the time series data which could be mistaken as an anomaly. In this case, the change would be due to a change in application activity level, not due to an anomaly caused by degraded application health or performance. Thus, the anomaly detection system may be configured to utilize different functions at activity periods or to adjust the functions to better approximate the changed time series as the application activity changes. This "normalization" of the system may be used to reduce false alarms that may appear as a deviation of concern but are actually just a reflection of expected increased activity or load on an application or the particular backend.

Figure 7:
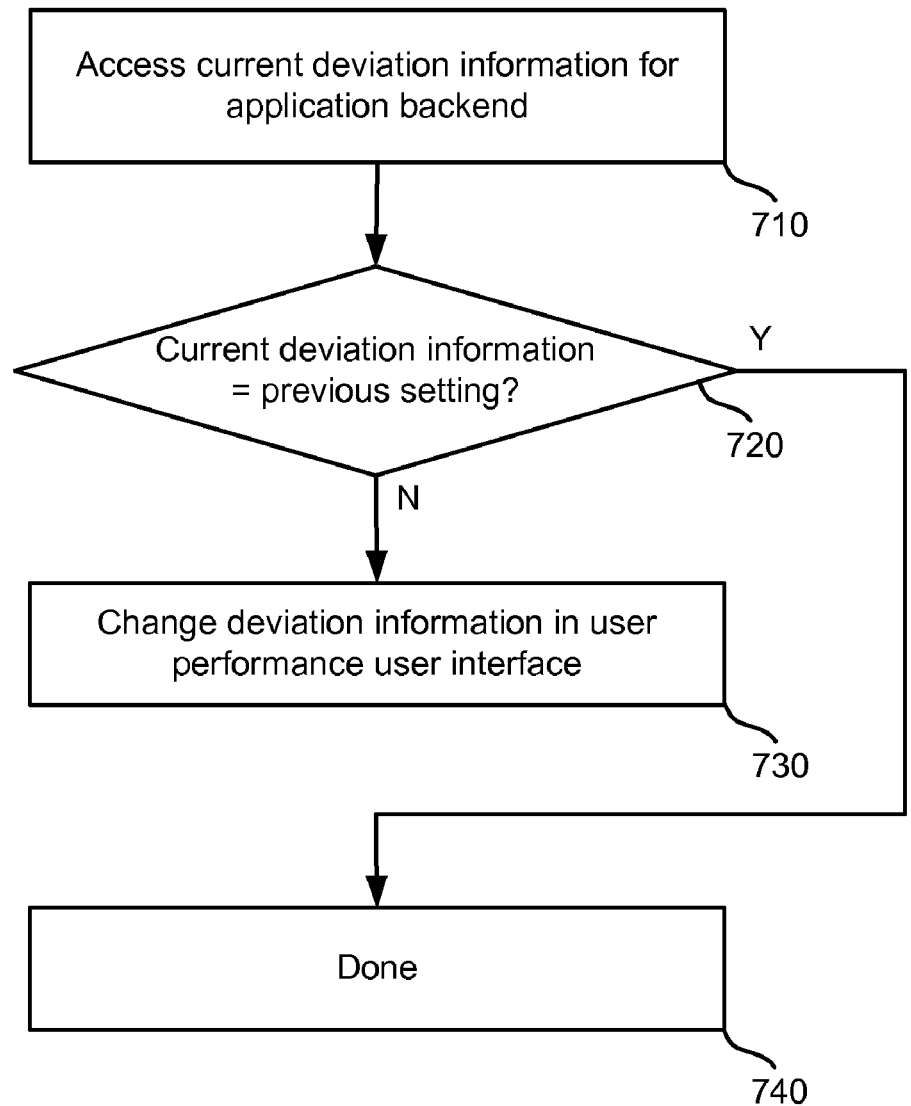
FIG. 7 is a flow chart of an embodiment of a process for providing baseline deviation information to a user.

FIG. 7 is a flow chart of an embodiment of a process for providing baseline deviation information to a user. In one embodiment, the process of FIG. 7 is performed concurrently with the process of FIG. 4. First, a graphic user interface (GUI) form is provided at step 710. The GUI form will provide performance data and deviation information to the user. In one embodiment, the GUI may be implemented as the interface of FIG. 1B. Performance data is accessed at step 720. The accessed performance data may relate to application response time, error rate, availability rate, and other information for the application. Next, the GUI is populated with the accessed performance data at step 730. In one embodiment, a grid with the GUI is populated with the accessed performance data.

Deviation information for a first application is accessed at step 740. In some embodiments, deviation information for other applications is not accessed at this time. In some embodiments, the accessed deviation information is generated in one of the processes of FIG. 6A-6C. The deviation information may include one string, a string of data for each backend, or information in some other format indicating the health level of one or more backends in communication with the currently selected application.

Next, a determination is made as to whether the current deviation information is equal to the previous deviation information or the particular application at step 750. If the current deviation information is the same as the previous deviation information, no change is needed to the user interface and the process of FIG. 7 continues to step 770. If the current deviation information does differ from the previous deviation information, the deviation information in the user interface is changed to reflect the current deviation information at step 760. The process of FIG. 7 then continues to step 770. In some embodiments, steps 750 and 760 provide more detail for step 440 of FIG. 4.

A determination is made at step 770 as to whether more applications exist in the GUI to be processed for deviation information. If no further applications are listed in the GUI, the process of FIG. 7 is done at step 780. If additional applications are listed in the GUI, the deviation information for the next application is accessed at step 790 and the process of FIG. 7 continues to step 750.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for determining performance, comprising:
   accessing performance data generated from monitoring two or more applications and associated with one or more backends which process requests from the two or more applications, the performance data including backend response time data for the one or more backends with respect to the two or more applications;
   determining a difference between response time data points of the performance data and predicted values for the response time data points, the response time data points associated with the response time for the one or more backends with respect to a first application of the two or more applications; and
   providing health information for the one or more backends with respect to the first application, the health information derived from the difference between the response time data points and the predicted values for the response time data points.

2. The method of claim 1, wherein said step of accessing includes:
   accessing performance data associated with a response time for each of one or more backends invoked by one or more applications.

3. The method of claim 1, wherein said step of accessing includes:
   aggregating backend performance data by application.

4. The method of claim 1, wherein said step of determining a difference includes:
   fitting two or more functions to the accessed performance data.

5. The method of claim 1, wherein said step of determining a difference includes:
   predicting the value of a data point of the accessed performance data using a function fitted to the accessed performance data.

6. The method of claim 1, further comprising:
   determining a deviation range of the difference in response to said step of determining a difference.

7. The method of claim 6, wherein said step of determining a deviation range includes:
   selecting one of two or more deviation ranges that contains the difference value.

8. The method of claim 6, wherein said step of determining a deviation range includes:
   incrementing a deviation count based on the difference; and
   selecting a deviation range based on the deviation count.

9. The method of claim 8, wherein said step of incrementing includes:
   incrementing the deviation count based on the difference calculated for two or more functions, wherein each of the two or more functions is used to predict a data point value for each data point of the selected performance data.

10. The method of claim 8, wherein said step of incrementing includes:
    configuring a count for each of two or more deviation ranges; and
    incrementing the count that corresponds to the deviation range which corresponds to the difference.

11. A method for determining performance, comprising:
    accessing performance data generated from monitoring two or more applications and associated with one or more remote systems which process requests from the two or more applications;
    calculating a difference between actual data point values of the performance data and predicted data point values for the performance data, the data points associated with the performance of the one or more remote systems with respect to a first application of the two or more applications; and
    providing health information for the one or more remote systems with respect to the first application, the health information derived from the difference between the actual data point values and the predicted data point values.

12. The method of claim 11, wherein accessing includes accessing groups of performance data by application.

13. The method of claim 11, wherein said step of calculating includes:
    predicting a value for actual data point values of the performance data using one or more functions.

14. The method of claim 11, wherein said step of calculating includes:
    fitting a function to previous actual data point values for one of the one or more remote systems with respect to the first application; and
    predicting a value for actual data point values for one of the one or more remote systems with respect to the first application using the fitted function.

15. The method of claim 11, wherein said step of providing health information includes:
    identifying a range of deviation for each difference between actual data point values of the performance data and predicted data point values for the performance data; and
    deriving the health information from the range of deviation.

16. The method of claim 11, wherein said step of providing health information includes:
    providing the health information for each remote system with respect to the first application in a user interface.

17. The method of claim 11, wherein said step of providing health information includes:
    providing rows and columns of health information, the rows and columns of health information indicating health information for one or more remote systems with respect to a first application with respect to the two or more applications.

18. A method for determining performance, comprising:
    accessing performance data generated from monitoring two or more applications and associated with one or more external devices which process requests from the two or more applications, the performance data including two or more time series of data associated with response times for the one or more external devices;
    predicting a value for each data point in a first time series of data of the two or more time series of data, the first time series of data indicating external device response time values at different times for a first external device of the one or more external devices with respect to a first application of the two or more applications;
    comparing the predicted data point values for the first time series of data to the actual data point values of the first time series of data;

identifying a deviation range from two or more deviation ranges for each difference between the predicted data point values and corresponding actual data point values for the first time series of data;

displaying a user interface for providing external device health information for one or more external devices with respect to the first application; and updating the external device health information for the first external device with respect to the first application in the user interface, the external device health information updated based on the deviation ranges.

19. The method claim 18, wherein said step of accessing includes:

accessing one time series of response time data for each external device with respect to the first application.

20. The method of claim 18, wherein said step of accessing includes:

aggregating the time series of data by application.

21. The method of claim 18, wherein said step of predicting a value includes:

fitting a function to the external device response time data for the first external device; and predicting a external device response time value using the function.

22. The method of claim 18, wherein said step of predicting a value includes:

predicting an external device response time value for the first external device using two or more functions fitted to previous response time data for the first external device.

23. The method of claim 18, wherein said step of identifying a deviation range includes:

identifying a deviation range from three or more deviation ranges.

24. The method of claim 18, wherein said step of identifying a deviation range includes:

incrementing a count based on a difference between the predicted response time value and the external device response time value; and selecting a deviation range based on the deviation count.

25. The method of claim 24, wherein said step of incrementing includes:

incrementing a count based on the difference between the predicted response time value and external device response time value for two or more functions associated with each external device with respect to the first application of the two or more applications.

26. The method of claim 18, wherein said step of providing the external device health information includes:

reporting the external device health information in a user interface which associates applications and external devices that process application requests.

27. One or more processor readable storage devices having processor readable code embodied on said processor readable storage devices, said processor readable code for programming one or more processors to perform a method comprising:

accessing application runtime data generated from monitoring two or more applications and associated with one or more remote machines which process requests from the two or more applications, the application runtime data including remote machine response time data for the one or more remote machines with respect to the two or more applications;

determining a difference between response time data points of the application runtime data and predicted values for the response time data points, the response time data points associated with the response time for the one or more remote machines with respect to a first application of the two or more applications; and reporting health information for the one or more remote machines with respect to the first application, the health information derived from the difference between the response time data points and the predicted values for the response time data points.

28. One or more processor readable storage devices claim 27, wherein said step of accessing includes:

accessing performance data associated with a response time for each of one or more remote machines invoked by one or more applications.

29. One or more processor readable storage devices of claim 27, wherein said step of accessing includes:

aggregating remote machine performance data by application.

30. One or more processor readable storage devices of claim 27, wherein said step of determining a difference includes:

fitting two or more functions to the accessed performance data.

31. One or more processor readable storage devices of claim 27, wherein said step of determining a difference includes:

predicting the value of a data point of the accessed performance data using a function fitted to the accessed performance data.

32. One or more processor readable storage devices of claim 27, further comprising:

determining a deviation range of the difference in response to said step of determining a difference.

33. One or more processor readable storage devices of claim 32, wherein said step of determining a deviation range includes:

selecting one of two or more deviation ranges that contains the difference value.

34. One or more processor readable storage devices of claim 32, wherein said step of determining a deviation range includes:

incrementing a deviation count based on the difference; and selecting a deviation range based on the deviation count.

35. One or more processor readable storage devices of claim 34, wherein said step of incrementing includes:

incrementing the deviation range based on the difference calculated for two or more functions, wherein each of the two or more functions is used to predict a data point value for each data point of the selected performance data.

36. One or more processor readable storage devices of claim 34, wherein said step of incrementing includes:

configuring a count for each of two or more deviation ranges; and incrementing the count that corresponds to the deviation range which corresponds to the difference.

37. An apparatus for processing data, comprising:

a communication interface;

a storage device; and one or more processors in communication with said storage device and said communication interface, said one or more processors access performance data associated with a response time of a backend device with respect to two or more applications that invoke the backend server, generate an expected value for a data point of the performance data for a backend device with respect to one of the two or more applications, determine deviation information associated with a difference between the expected value for the data point and the performance data point, and report the deviation information for each backend server with respect to the first application of the two or more applications.

38. The apparatus of claim 37, wherein the deviation information indicates a health state of the backend server with respect to the first application of the two or more applications.

39. The apparatus of claim 37, the one or more processors able to identify each backend that is invoked by an application within a table in a user interface and display an icon indicating the health of each backend server with respect to the first application of the two or more applications.

* * * * *